(No Model.)
N. P. FLUENT.
COMBINED BEE SWARMER, CATCHER, AND SEPARATOR.
No. 500,197. Patented June 27, 1893.
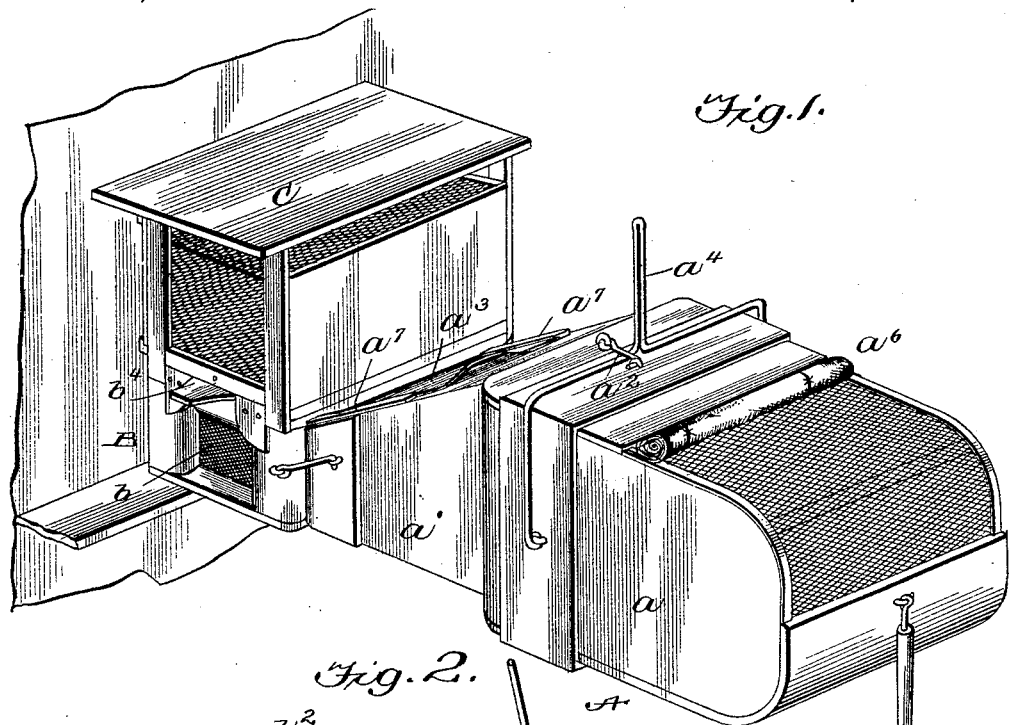
Fig. 1.
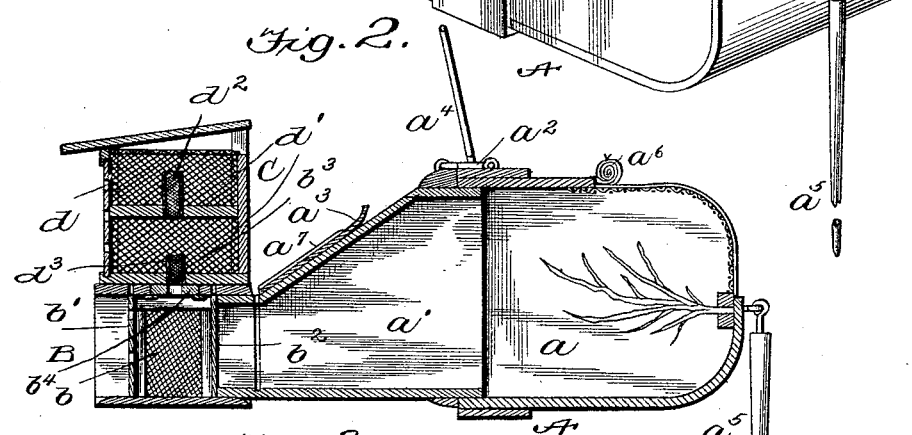
Fig. 2.
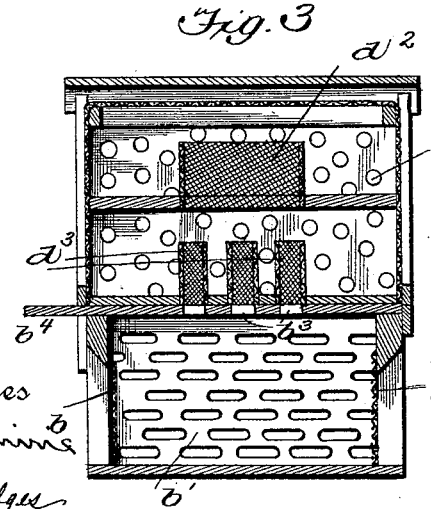
Fig. 3.
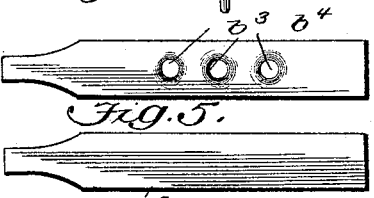
Fig. 4.
Fig. 5.
Witnesses
Inventor
Nelson P. Fluent,
by John Wedderburn
Attorney

UNITED STATES PATENT OFFICE.

NELSON P. FLUENT, OF SAND CREEK, WISCONSIN.

COMBINED BEE SWARMER, CATCHER, AND SEPARATOR.

SPECIFICATION forming part of Letters Patent No. 500,197, dated June 27, 1893.

Application filed August 30, 1892. Serial No. 444,522. (No model.)

*To all whom it may concern:*

Be it known that I, NELSON P. FLUENT, of Sand Creek, in the county of Dunn and State of Wisconsin, have invented certain new and useful Improvements in a Combined Bee-Swarmer, Catcher, and Separator; and I do hereby declare the following to be a full, clear, and exact description of the invention, such as will enable others skilled in the art to which it appertains to make and use the same.

This invention relates to an improved combined bee swarmer, catcher and separator, the object of the invention being to provide a cheap and simple contrivance that can be utilized for swarming the bees, returning the same to the hive, preventing the escape of the "queen" and also for the purpose of separating and extracting the drones, and taking swarms from trees.

My invention consists essentially in the peculiar construction, and combination of the several receptacles which I denominate the swarmer, the catcher, and separator, all arranged for the purpose hereinafter explained.

My invention consists also in certain details of construction, and minor combinations which will also be fully set forth and particularly pointed out in the claims.

In the accompanying drawings:—Figure 1 is a perspective view of my combined attachment complete. Fig. 2 is a vertical longitudinal section of the same. Fig. 3 is a sectional view illustrating the combination of the queen catcher and drone separator and extractor. Figs. 4 and 5 show details of construction.

In the practical embodiment of my invention I employ a receptacle A which I term the "swarmer," which receptacle is made in sections $a$ and $a'$, the section $a'$ being made tapering or funnel-shape as shown, and is connected with the section $a$ by the hooks $a^2$. The top and rear portions of the sections $a$ are cut away and covered with wire-gauze to admit light to the swarmer. The forward end of the swarmer is shaped to fit the entrance of a hive, whereby the bees can pass readily from the hive to the swarmer and none escape. A vertically sliding door or gate $a^3$ is arranged near the forward end of the swarmer, the purpose of which is to prevent the bees from escaping from the swarmer, or prevent them entering the same should such an occasion arise. When not in use the door $a^3$ rests in ways $a^7$ attached to top of section $a'$. A handle $a^4$ is attached to the rear section by means of which it can be carried from place to place and a support $a^5$ is secured to the rear side for the purpose of holding the swarmer in place against the hive. A piece of oil-cloth $a^6$ may also be attached to the swarmer if desired, the purpose of which will appear farther on.

B indicates a receptacle which I denominate the "queen catcher or retainer" said receptacle having wire-gauze ends $b$, a perforated forward side $b'$, and a vertically slidable imperforate rear-side $b^2$. The catcher B is shaped to fit the forward end of the swarmer A, and though this swarmer may be used independent of the catcher I prefer to connect the two by means of hooks, as shown, and when the swarmer and catcher are so combined for swarming, the rear side $b^2$ is slid up or out affording an uninterrupted passage from the hive to the swarm. The receptacle B is adapted to be placed at the entrance of the hive and prevents the queen bee from escaping, as her escape would render the colony useless; and in order to permit the drones which follow the "queen" and do not work, to become separated from the working bees, I provide a third receptacle C called the "drone-separator," said receptacle being arranged upon the queen catcher and communicating therewith. The separator C has wire gauze ends, and a perforated forward side $d$. This receptacle is also divided horizontally into upper and lower compartments by a partition $d'$, communication being established between the compartments by means of a single escape tube $d^2$, essentially elliptical in cross-section. A plurality of escape tubes $d^3$ are arranged in the bottom of the receptacle C and register with a plurality of escape openings $b^3$ formed in a slide $b^4$, constituting a part of the top of the receptacle B. A solid slide $b^5$ is also used at certain times hereinafter referred to. The object of the perforated forward slide is to permit working bees, which might mingle with the drones, to escape and return to the hive; and the object of the escape tubes $d^3$, and the single tube $d^2$, is to prevent the "queen" entering the upper chamber should she escape from the receptacle B, into the lower compartment. The queen catcher and drone separator are usually combined as shown and attached to the hive independent of the swarmer although there are times when it becomes necessary to use all the receptacles conjointly.

The several parts being arranged as shown in Figs. 1 and 2 we will suppose it is desired to swarm the bees. In such case, when the young swarm begins to leave the hive, the swarmer is arranged at the entrance of the hive and supported in such position by means of support $a^5$. The slide $a^3$ is then drawn out and placed in the ways $a^7$. The swarmer is left in this position for a short while when the door $a^3$ is again slid down to close the entrance to the swarmer. The bees can now be handled as one desires and should it be desired to rehive the swarm the queen catcher or retainer is connected with the mouth of the swarmer, and the entire device leveled up to the mouth of the hive by means of the support $a^5$. The perforated slide $b$ and imperforate slide $b^2$ are then withdrawn and a solid slide $b^5$ inserted in the top of receptacle B. The rear end of the swarmer is then darkened by the cloth $a^6$, and by the use of a little smoke the swarm will go direct to the hive provided for them.

When it is desired to collect the queen and drones the queen catcher is connected with the swarmer containing the bees, as before described and the perforated forward slide inserted. By darkening the swarmer and using smoke the working bees will pass through the perforated slide while the queen and drones cannot. The rear imperforate slide is then inserted, retaining the queen and drones which can be detached from the swarmer and carried where desired. When a swarm is in a tree the rear portion of swarmer is mounted upon a suitable handle, and elevated to receive the bees which are shaken from the tree into the basket; they are then hived the same as though they had been swarmed from a hive. The separator may or may not be used now, as desired, and is regulated by the slides $b^4$ and $b^5$ respectively. After the bees have been hived, the swarmer is detached and the catcher and separator retained, thus preventing the escape of the queen and allowing the separation of the drones. The separator can be taken off and cleaned whenever it becomes necessary.

When the rear section of the swarmer is used to transport the bees the oil cloth is used to cover the forward end of the same.

I claim as my invention—

1. An improved swarmer, composed of front and rear sections connected with each other, the front section being made tapering and provided with a sliding door or gate, the rear section having a wire gauze top portion and a cloth attached to said section for the purpose set forth.

2. The combination with the catcher receptacle having a perforated forward side, imperforate rear side, and a perforated slide in the top, of a separator receptacle having a plurality of escape tubes in its bottom registering with the perforations in the slide, a horizontal partition having a single escape tube, and the perforated forward side for the escape of working bees, all arranged substantially as set forth.

3. The combination, with a swarming receptacle having a tapered forward end, of a catcher receptacle adapted to fit upon the said tapered end, said catcher receptacle having gauze ends, a rigid perforated forward side, and a removable imperforate slide arranged in the rear portion and adapted to be moved when it is desired to pass the bees from the catcher to the swarmer, substantially as set forth.

4. An improved catcher receptacle adapted to fit the entrance of a hive, said receptacle having a solid bottom, wire gauze ends, a perforated forward side, a removable imperforate rear side, a top having a central opening, and a slide for closing said opening, substantially as set forth.

5. An improved separator receptacle, having a solid bottom and wire gauze ends and top, a series of escape tubes passed through the bottom, a central horizontal partition dividing the receptacle into two compartments and a single escape tube, elliptical in cross-section, passing through said central partition, substantially as set forth.

In testimony whereof I have signed this specification in the presence of two subscribing witnesses.

NELSON P. FLUENT.

Witnesses:
JOSEPH PAULUS,
JENNIE JACKSON.